United States Patent
Blackmon et al.

(10) Patent No.: US 8,572,455 B2
(45) Date of Patent: Oct. 29, 2013

(54) SYSTEMS AND METHODS TO RESPOND TO ERROR DETECTION

(75) Inventors: H. Lee Blackmon, Moline, IL (US); Ryan S. Haraden, Rochester, MN (US); Joseph A. Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 12/546,095

(22) Filed: Aug. 24, 2009

(65) Prior Publication Data
US 2011/0047440 A1 Feb. 24, 2011

(51) Int. Cl.
*H03M 13/00* (2006.01)

(52) U.S. Cl.
USPC .......................................................... 714/754

(58) Field of Classification Search
USPC .................. 714/746, 753–754, 763; 365/222
See application file for complete search history.

(56) References Cited

U.S. PATENT DOCUMENTS

| | | | | |
|---|---|---|---|---|
| 7,580,309 B2* | 8/2009 | Yang et al. | | 365/222 |
| 7,613,060 B2* | 11/2009 | Smith | | 365/222 |
| 7,979,759 B2* | 7/2011 | Carnevale et al. | | 714/718 |

* cited by examiner

*Primary Examiner* — Shelly A Chase
(74) *Attorney, Agent, or Firm* — Toler Law Group

(57) ABSTRACT

Systems and methods to respond to error detection are provided. First data may be received at a first memory controller port in response to a read command issued from the first memory controller port. The read command may be issued as a second read command from a second memory controller port after determining that the first data contains a first uncorrectable error. Second data may be received at the second memory controller port in response to the second read command. A repair write command may be issued from the first memory controller port after determining that the second data does not contain any errors. The repair write command may initiate writing the second data from the first memory controller port.

20 Claims, 12 Drawing Sheets

SYSTEMS AND METHODS TO RESPOND TO ERROR DETECTION

I. FIELD OF THE INVENTION

The present invention relates generally to data communications, and more specifically, to addressing errors detected in data communications.

II. BACKGROUND

Successful data storage and transmission may be impeded by multi-bit or single bit errors present in the data. Hardware diagnostic tests use error correction codes (ECCs) to detect and correct single-bit errors, which are categorized as correctable errors. ECCs are also used to detect multi-bit errors, which are known as uncorrectable errors.

Detection of an uncorrectable error often prompts a machine check condition. If the computer system is alternatively running in memory mirrored mode, a hot memory replace may alternatively result. For example, if a read to a memory structure results in an uncorrectable error, the read is reissued to a complement memory structure. The complement memory structure functions as a mirror copy. The read data from the complement structure is returned to a requesting agent. The uncorrectable error is reported as a recoverable error. Subsequent reads are directed to a complement port while a hot memory replace is performed.

Use of a memory structure is limited while a machine check condition or a hot memory replace is accomplished. Therefore, limiting repair actions would be beneficial.

III. SUMMARY OF THE DISCLOSURE

In a particular embodiment, a method to respond to error detection is disclosed. The method includes receiving first data at a first memory controller port in response to a read command issued from the first memory controller port. The read command may be issued from a second memory controller port after determining that the first data contains an uncorrectable error. The method further includes receiving second data at the second memory controller port in response to the read command issued from the second memory controller port. A repair write command may be issued from the first memory controller port after determining that the second data does not contain any errors. The repair write command may initiate writing the second data from the first memory controller port.

In another embodiment, a method of responding to error detection is disclosed. The method includes receiving first data at a first memory controller port in response to a read command sent from the first memory controller port. The method also includes reissuing the read command as a second read command from the first memory controller port after determining that the first data contains a first uncorrectable error. Second data may be received at the first memory controller port in response to the second read command. The method includes issuing a third read command from a second memory controller port after determining that the second data contains the uncorrectable error. The method also includes receiving third data at the second memory controller port in response to the third read command.

In another embodiment, a method of responding to error detection is disclosed. The method includes receiving a retrain request from a memory controller. The method also includes issuing refreshes to a subset of memory ranks that have not received a refresh subsequent to the memory ranks exiting a first self-timed refresh mode. A command instructing the memory ranks to enter a second self-timed refresh mode may be issued.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

IV. BRIEF DESCRIPTION OF THE DRAWINGS

V. DETAILED DESCRIPTION

Figure 1:
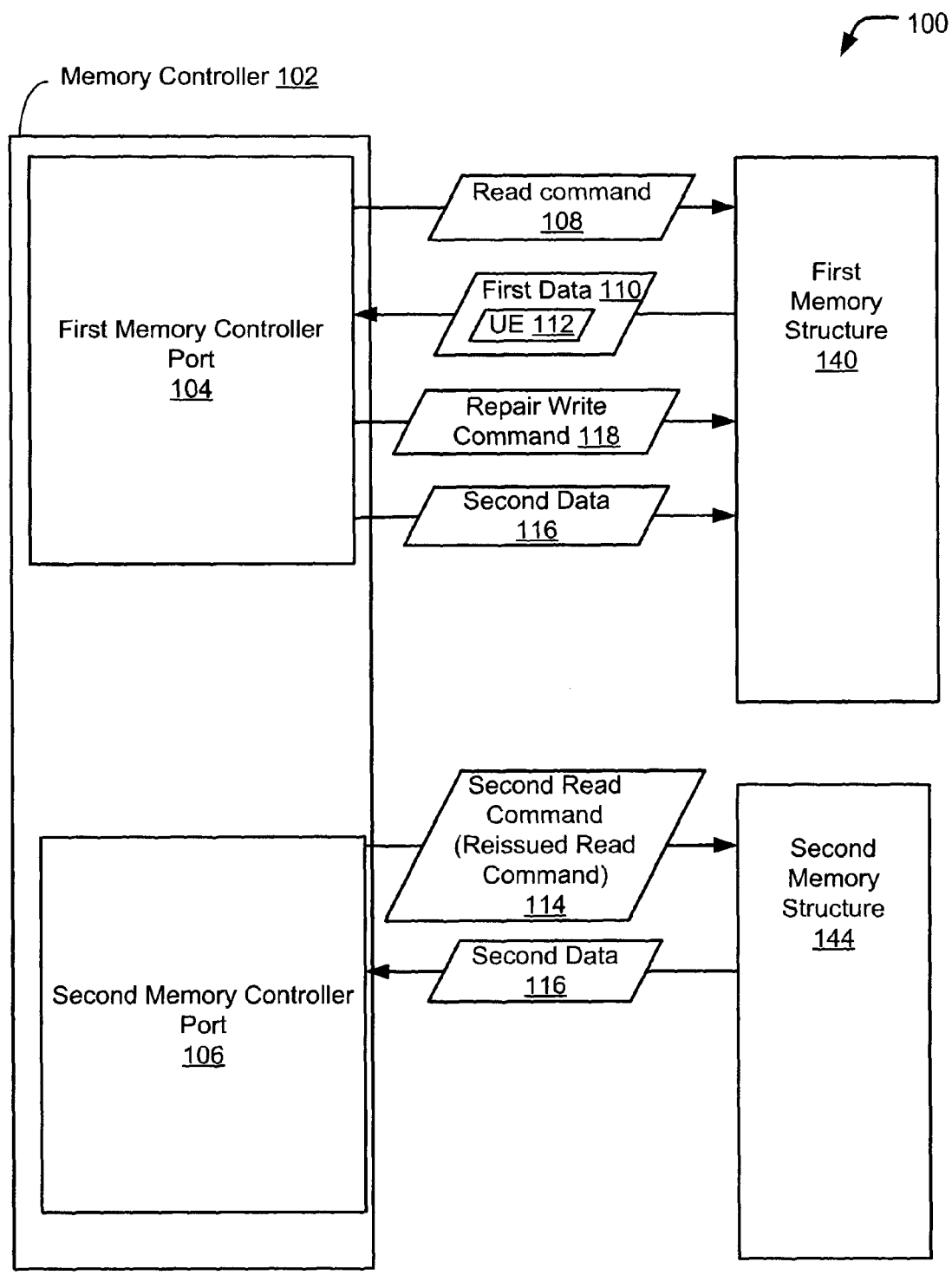
FIG. 1 is a block diagram of a first embodiment of a system to respond to error detection.

FIG. 1 is a diagram of a first embodiment of a system to respond to error detection and is generally designated 100. The system 100 includes a first memory structure 140, a second memory structure 144, and a memory controller 102 with a first memory controller port 104 and a second memory controller port 106.

Generally, the memory controller 102 may repair first data 110 retrieved from a first address on the first memory structure 140 with second data 116 from a second address on the second memory structure 144. The repair may be accomplished in response to detecting a first uncorrectable error 112 in the first data 110. Processes of an embodiment may contrast those associated with a hot memory replace. In hot memory replace, data in all the addresses of the first memory structure 140 are replaced with data from all the addresses of the second memory structure 144. For instance, the memory controller 102 may replace data on an address-by-address basis. Replacing a single address may take less time than replacing data in all the addresses. Therefore, replacing on an address-by-address basis may better utilize the first memory structure 140 than performing a hot memory replace.

In a particular embodiment, the memory controller 102 is configured to issue a read command 108 from the first memory controller port 104. The memory controller 102 may be configured to receive the first data 110 at the first memory controller port 104. The first data 110 may be received in response to a read command 108 issued from the first memory controller port 104. The memory controller 102 may be configured to reissue the read command 108 as a second read command 114 from the second memory controller port 106 after determining that the first data 110 contains a first uncorrectable error 112. The memory controller 102 may be configured to receive the second data 116 at the second memory controller port 106 in response to the second read command 114. The memory controller 102 may be configured to issue a repair write command 118 from the first memory controller port 104 after determining that the second data 116 does not contain any errors. The repair write command 118 may initiate writing the second data 116 from the first memory controller port 104.

The memory controller 102 may issue a read command 108 from the first memory controller port 104. The read command 108 may direct the first memory structure 140 to retrieve the first data 110 at the first address. For example, in response to receiving the read command 108, the first memory structure 140 may retrieve the first data 110 at the first address and transmit the first data 110 to the first memory controller port 104. The memory controller 102 may receive the first data 110 at the first memory controller port 104. The first memory controller port 104 may include logic that checks the first data 110 for errors and produces ECCs. For instance, the ECC checking may indicate that the first data 110 contains multi-bit errors by producing an ECC indicating that the first data 110 contains the first uncorrectable error 112.

The memory controller 102 may respond to the detection of the uncorrectable error 112 in the first data 110 by attempting to retrieve good data from the second memory structure 144 via the second memory controller port 106. For example, the memory controller 102 may issue the read command 108 as a second read command 114 from the second memory controller port 106.

In a particular embodiment, the second memory structure 144 is a mirror copy of the first memory structure 140. Data retrieved by the second memory structure 144 in response to the second read command 114 may be a mirror copy of the data that the first address of the first memory structure 140 should contain. For instance, the second memory structure 144 may retrieve the second data 116 in response to the second read command 114. The second memory structure 144 may transmit the second data 116 to the second memory controller port 106. The memory controller 102 may receive the second data 116 at the second memory controller port 106.

The second memory controller port 106 may include logic that checks the second data 116 for errors and produces ECCs if errors are identified. In a particular embodiment, ECC checking in the second memory controller port 106 indicates that the second data 114 is free of errors. In response to determining that the second data 114 does not contain any errors, the memory controller 102 may issue a repair write command 118 from the first memory controller port 104. The repair write command 118 may initiate writing of the second data 116 from the first memory controller port 104 to the first memory structure 140. For example, the first memory controller port 104 may write the second data 116 into the first address. In this case, the first data 110 is replaced by the second data 116.

Repairing the first memory structure 140 with the second data 116 retrieved in response to the second command 114 may allow the memory controller to repair uncorrectable errors on a single address basis. Repairing a single address containing the uncorrectable error prevents the memory controller 102 from replacing data on the first memory structure 140 that may not contain uncorrectable errors, as occurs during a hot memory replace procedure. Replacing only data that is known to have an uncorrectable error may increase the effectiveness of a repair action by reducing the amount of time required to perform the repair action.

Figure 2:
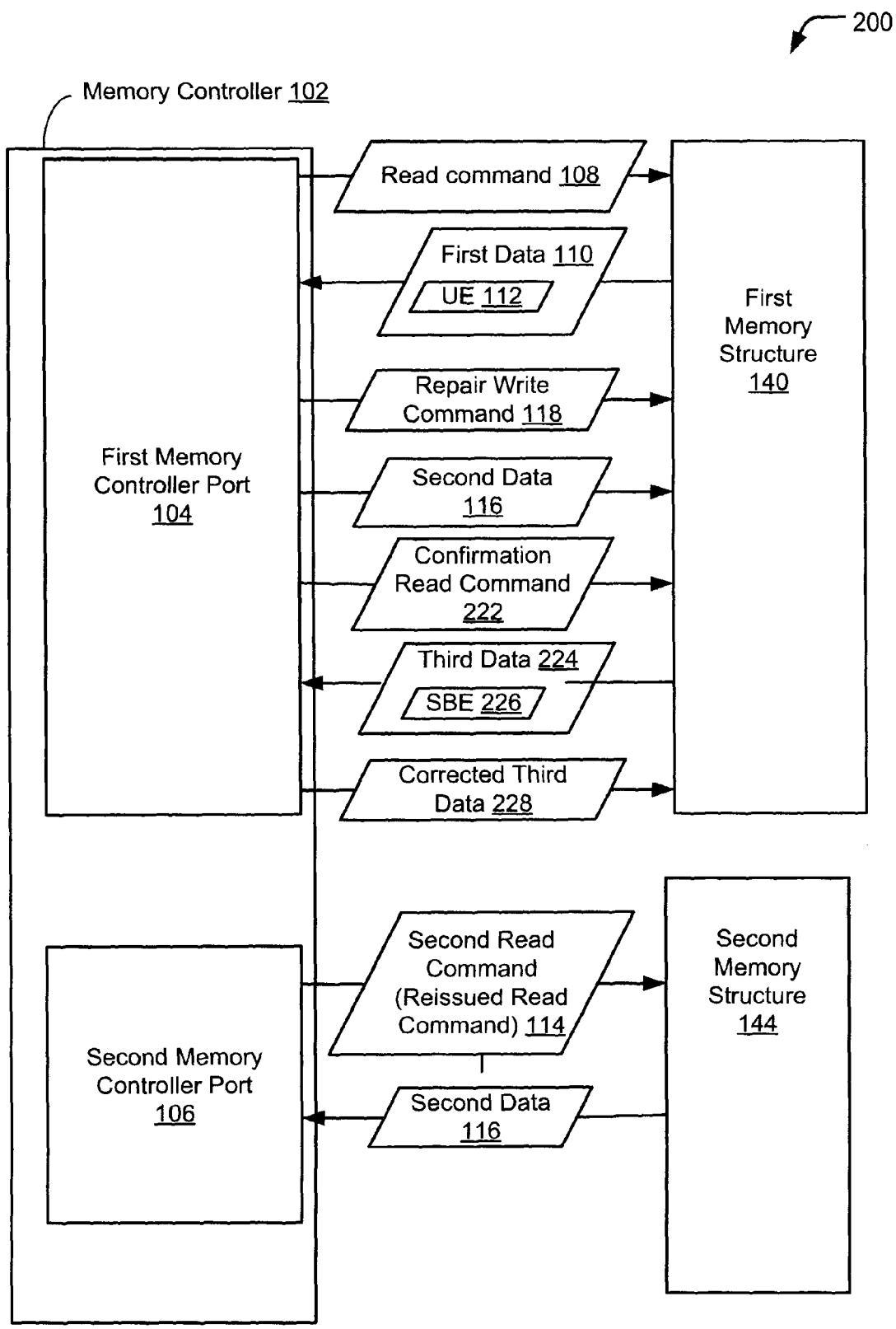
FIG. 2 is a block diagram of a second embodiment of a system to respond to error detection.

Referring to FIG. 2, a diagram of a second embodiment of a system to respond to error detection is illustrated and is generally designated 200. The system 200 includes many elements found in the system 100 referred to in FIG. 1, where similar elements have the same reference number.

The memory controller 102 may issue the read command 108 from the first memory controller port 104. The read command 108 may direct the first memory structure 140 to retrieve the first data 110 at the first address. For instance, in response to receiving the read command 108, the first memory structure 140 may retrieve the first data 110 at the first address and transmit the first data 110 to the first memory controller port 104. The memory controller 102 may receive the first data 110 at the first memory controller port 104. The first memory controller port 104 may include logic that checks the first data 110 for errors and generates ECCs. For example, the ECC checking may indicate that the first data 110 contains a multi-bit error by generating an ECC indicating that the first data 110 contains the first uncorrectable error 112.

The memory controller 102 may respond to the detection of the uncorrectable error 112 in the first data 110 by attempting to retrieve good data from the second memory structure 144 via the second memory controller port 106. For instance, the memory controller 102 may reissue the read command 108 as the second read command 114 from the second memory controller port 106. In a particular embodiment, the second memory structure 144 is a mirror copy of the first memory structure 140. Data retrieved by the second memory structure 144 in response to the second read command 114 is a mirror copy of the data that the first address of the first memory structure 140 should contain. For example, the second memory structure 144 may retrieve the second data 116 in response to the second read command 114 and transmit the second data 116 to the second memory controller port 106. The memory controller 102 may receive the second data 116 at the second memory controller port 106.

The second memory controller port 106 may include logic that checks the second data 116 for errors and produces ECCs if errors are identified. ECC checking in the second memory controller port 106 indicates that the second data 116 does not contain any errors. In response to determining that the second data 116 does not contain any errors, the memory controller 102 may issue the repair write command 118 from the first memory controller port 104. The repair write command 118 may initiate writing the second data 116 from the first memory controller port 104 to the first memory structure 140. For instance, the first memory controller port 104 may write the second data 116 into the first address. In this case, the first data 110 may be replaced by the second data 116.

To verify that the repair action was successful, the memory controller 102 may issue a confirmation read command 222. The confirmation read command 222 may be generated by the first memory controller port 104 after the repair write command 118 is issued from the first memory controller port 104 to the first memory structure 140. The confirmation read command may instruct the first memory structure 140 to return data (e.g., third data 224) stored at the first address. For example, the first memory structure 140 may retrieve the third data 224 in response to the confirmation read command and transmit the third data 224 to the first memory controller port 104. The memory controller 102 may receive the third data 224 in response to the confirmation read command 222 issued from the first memory controller port 104.

The ECC checking at the first memory controller port 104 may indicate whether the third data 224 includes any errors. For instance, the ECC checking may indicate that the third data 224 contains a single bit error 226 that the first memory controller port 104 is able to correct. In this case, the memory controller 102 may invoke redundant bit steering to correct the single bit error 226 detected in the third data 224. The memory controller 102 may issue corrected third data 228 from the first memory controller port 104 to the first memory structure 140.

After correcting the single bit error in the third data 224, the memory controller 102 may reduce command latency by issuing subsequent read commands from both the first memory controller port 104 and the second memory controller port 106. For example, a new read request received at the memory controller 102 may be translated and assigned to either the first memory controller port 104 or the second memory controller port 106. By only replacing the first data 110 in the first address and not performing a hot memory replace of the first memory structure 140, the first memory structure 140 may be available to the memory controller 102 for reading and writing in a reduced amount of time. The faster the memory structure completes the repair action, the sooner the memory controller 102 may be able to direct new reads or writes to both memory controller ports.

Alternatively, the ECC checking may indicate that the third data 224 contains an uncorrectable error (e.g., a second uncorrectable error). The memory controller 102 may perform a hot memory replace of the first memory structure 140 with data from the second memory structure 144 after determining that the third data 224 contains the second uncorrectable error.

Figure 3:
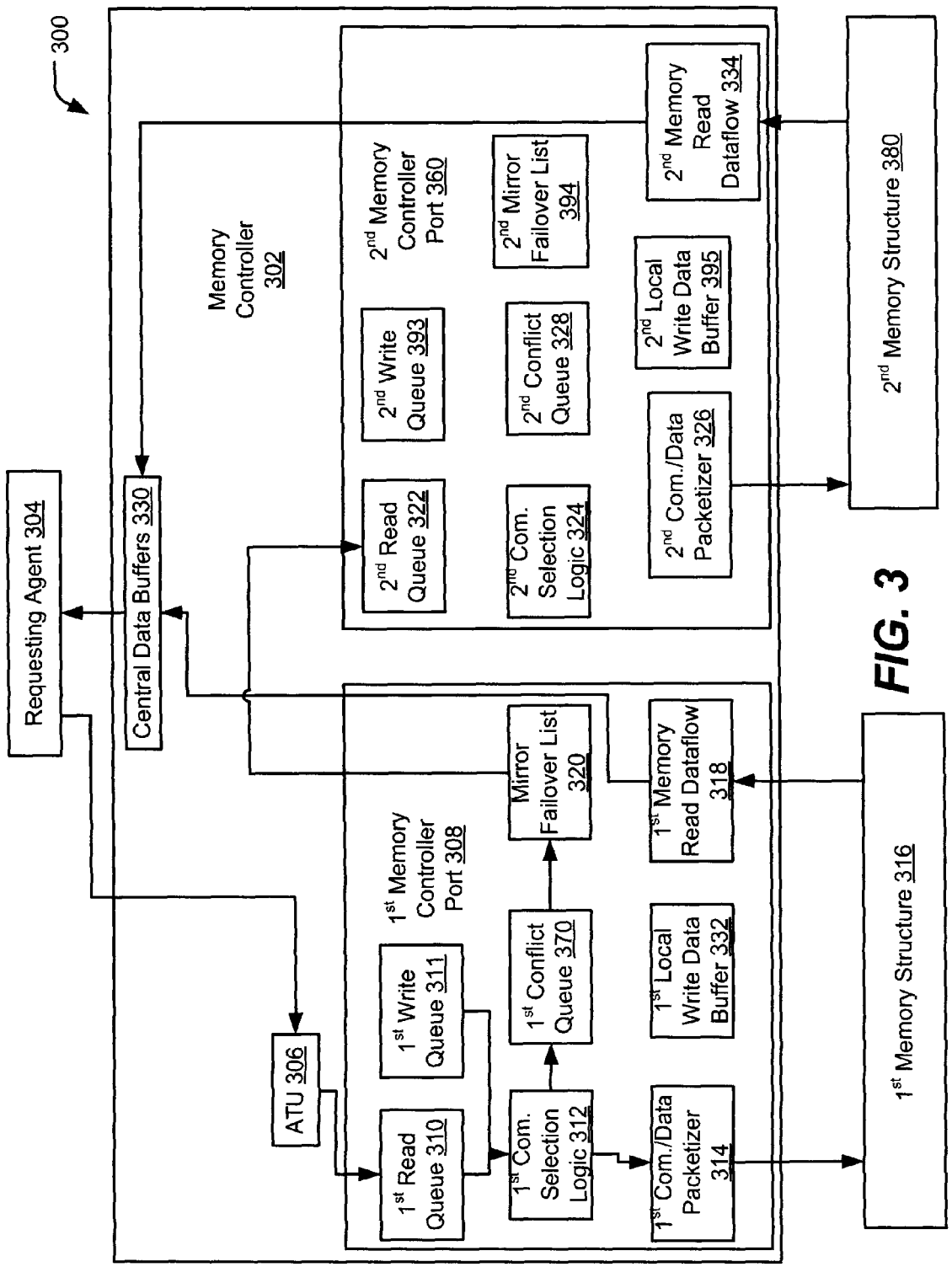
FIG. 3 is a block diagram of a third embodiment of a system to respond to error detection.

Referring to FIG. 3, a diagram of a third embodiment of a system to respond to error detection is illustrated and is generally designated 300. The system 300 includes a requesting agent 304, a memory controller 302, a first memory structure 316, and a second memory structure 380. The memory controller 302 includes central data buffers 330, a memory address translation unit 306, a first memory controller port 308, and a second memory controller port 360.

The requesting agent 304 may be configured to transmit a processor read request to the memory controller 302. In a particular embodiment, the address translation unit 306 receives the processor read request from the requesting agent 304. The memory controller 302 may assign one of the central data buffers 330 to the processor read request. The processor read request may be translated from a real address to a DRAM address by memory address translation logic in the memory address translation unit 306. In a particular embodiment, DRAM addresses may correspond to addresses in the first memory structure 316. The translated DRAM address may then be forwarded from the address translation unit 306 to the first memory controller port 308 and placed in a first read queue 310. From the first read queue 310, the DRAM address may be transmitted to first command selection logic 312. The first command selection logic 312 may schedule reads, writes, refreshes, zqcals, and synchronization for the first memory controller port 308. In response to receiving the DRAM address, the first command selection logic 312 may chose a first read command and forward the first read command to a first command/data packetizer 314 and a first conflict queue 370. Alternatively, conflict queues may be known as in-flight command trackers.

The first conflict queue 370 may track the first read command. The first command/data packetizer 314 may issue the first read command to the first memory structure 316. Issuing the first read command to the first memory structure 316 may include transmitting the first read command to a first redrive device (not illustrated). For instance, the first memory controller port 308 may send the first read command via a first high speed link to the first redrive device or alternatively via a direct connection to the first memory structure 316.

In response to the first read command, the first memory structure 316 may return first data to the first memory controller port 308. At the first memory controller port 308, the received first data may be processed at a first memory read dataflow 318. Processing at the first memory read dataflow 318 may include checking for errors. For example, ECC may be used to determine that the first data has the first uncorrectable error. If the first memory read dataflow 318 determines that the first data has an uncorrectable error, the first conflict queue 370 is notified of the error. For instance, the first conflict queue 370 may receive an uncorrectable error indication during "Statval" (statistical valid) cycle.

As part of tracking the first read command, the first conflict queue 370 may not receive a "done" indication to clear the uncorrectable error indication after the read command is reissued. The memory address translation unit 306 may receive indication of the first uncorrectable error and in response direct all translated DRAM addresses related to subsequent processor read requests to the second memory controller port 360.

In response to notification that the first data contains the first uncorrectable error, the first conflict queue 370 may place an entry in a Mirror Failover List 320. In a particular embodiment, the logic in the Mirror Failover List 320 schedules a repair write for the DRAM address accessible on the first memory controller port 308 associated with the processor read request. Scheduling a repair write may include placing the repair write in the first write queue 311. The repair write may include dependency to prevent the repair write from being issued before completion of a Mirror Failover Read on the second memory controller port 360. Completion of the Mirror Failover Read before issuing the repair write may prevent dispatch of processor write commands to the same address that prevents overwriting the address with stale data. The logic in the Mirror Failover List 320 may schedule a confirmation read on the first memory controller port 308 (with dependency on completion of the repair write) and may schedule a Mirror Failover Read to the second memory controller port 360.

The Mirror Failover Read may be received at the second memory controller port 360 in a second read queue 322. The second memory controller port 360 may acknowledge receipt of the Mirror Failover Read to the first memory controller port 308. In response to the receipt, the first conflict queue 370 on the first memory controller port 308 may clear the entry related to the first read command. The second command selection logic 324 is responsible for scheduling reads, writes, refreshes, zqcals, and synchronization for the second memory controller port 360. The second memory controller may assign one of the central data buffers 330 to the Mirror Failover Read.

In response to receiving the Mirror Failover Read, the second command selection logic 324 may chose a second read command and forward the second read command to a second command/data packetizer 326 and a second conflict queue 328. From the second conflict queue 328, the second read command may be tracked. In a particular embodiment, the second command/data packetizer 326 issues the second read command to the second memory structure 380. Issuing the second read command to the second memory structure 380 may include transmitting the second read command to a second redrive device (not illustrated) via a second high speed link.

In response to the second read command, the second memory structure may return second data to the second memory controller port 360. At the second memory controller port 360, the second data is processed at a second memory read dataflow 334. Processing at the second memory read dataflow 334 may include checking ECC to determine if the second data contains any errors. The second conflict queue 328 may clear the entry related to the Mirror Failover Read and may indicate completion of the Mirror Failover Read to the first memory controller port 308. In response to the indication of completion of the Mirror Failover Read, the first write queue 311 may release the repair write command.

In response to determining that the second data does not contain any errors, the second memory read dataflow 334 may forward the second data to the central data buffer assigned to the Mirror Failover Read. The central data buffers 330 may return the second data to the requesting agent 304. The first memory port may then pull the second data into the first local write data buffer 332. The first command/data packetizer 314 may then packetize the repair write command and the second data. The packetized repair write command and the second data may then be transmitted by the first command/data packetizer 314 to the first memory structure 316. Upon completion of the repair command, a confirmation read may be dispatched from the first memory controller port 308 to check to see if the uncorrectable error still exists. For example, the first command/data packetizer 314 may issue the confirmation read command to the first memory structure 316. In response to the issued confirmation read command, the first memory read dataflow 318 may receive the third data.

In a particular embodiment, ECC checking in the first memory read dataflow 318 may indicate whether the third data contains errors. If the repair action was successful and the third data does not contain any errors, the first memory controller port 308 may indicate to the address translation unit 306 to resume issuing the subsequent read commands to both memory ports. If the repair action was unsuccessful, the first memory controller port 308 may proceed with a hot memory replace. As described herein, a hot memory replace may include replacing all of the data on the first memory structure 316 with all of the data on the second memory structure 380. If the repair action was successful and the third data contains an uncorrectable error (e.g., a second uncorrectable error), the first memory controller may proceed with a second repair action on the second uncorrectable error.

Alternatively, if the ECC checking indicates that the third data contains a single bit error, then redundant bit steering (RBS) in the first memory controller port 308 may be invoked for a reported symbol indicated by the ECC. For instance, if a hard error aligned with a soft error and the first repair action fixed the soft error, then the RBS may correct the hard error in the third data.

Repairing the first memory structure 316 with the second data retrieved in response to the second command may allow the memory controller 302 to repair uncorrectable errors on a single address basis. Repairing a single address containing the uncorrectable error prevents the memory controller 302 from replacing data on the first memory structure 316 that may not contain uncorrectable errors, as occurs during the hot memory replace procedure. Replacing only data that is known to have an uncorrectable error increases the effectiveness of a repair action by reducing the amount of time required to perform the repair action.

In a particular embodiment, the system 300 is used to remove soft errors in addresses of the first memory structure 316. For example, a scrub controller in the first memory controller port 308 may access all addresses in the first memory structure 316 to periodically check for errors. If the scrub controller detects an error in an address in the first memory structure 316, the scrub controller may correct the error. Correcting errors periodically in the first memory may reduce the probability of alignment of a single bit error with another single bit error that may ultimately result in an uncorrectable error. If the scrub controller of the first memory controller port 308 hits an address with an uncorrectable error, the first memory controller port 308 may use the second memory controller port 360 to attempt to repair the uncorrectable error. Scrub flow may be similar to the normal read flow discussed herein with the exception that the repair write is actually queued with every scrub read through normal scrub flow. For instance, in scrub flow the repair write needs to have dependency updated after a scrub read fails.

A scrub write may be placed in the first write queue 311 with dependency on the yet-to-be-placed scrub read. The scrub controller presents a scrub read request to command arbitration logic within the memory controller 302. The memory controller 302 assigns one of the central data buffers 330 to the scrub read request. The scrub read request may be translated from a real address to a second DRAM address by the memory address translation logic in the memory address translation unit 306. The second translated DRAM address may be forwarded from the address translation unit 306 to the first memory controller port 308 and placed in the first read queue 310. From the first read queue 310, the second DRAM address may be transmitted to the first command selection logic 312.

In response to receiving the second DRAM address, the first command selection logic 312 may choose the first read command and forward the first read command to the first command/data packetizer 314 and the first conflict queue 370. In a particular embodiment, the first conflict queue 370 tracks the first read command. The first command/data packetizer 314 may issue the first read command to the first memory structure 316. Issuing the first read command to the first memory structure 316 may include transmitting the first read command to a first redrive device (not illustrated). For example, the first memory controller port 308 may send the first read command via the first high speed link to the first redrive device or alternatively via a direct connection to the first memory structure 316.

The first memory structure 316 may return the first data to the first memory controller port 308 in response to the first read command. In a particular embodiment, at the first memory controller port 308 the first data may be processed at the first memory read dataflow 318. Processing at the first memory read dataflow 318 may include checking for errors. For instance, the ECC checking may be used to determine that the first data has the first uncorrectable error. In a particular embodiment, if the first memory read dataflow 318 determines that the first data has the first uncorrectable error, the first conflict queue 370 is notified of the first uncorrectable error. For example, the first conflict queue 370 may receive the uncorrectable error indication. As part of tracking the first read command, the first conflict queue 370 may receive a "done" indication to clear the uncorrectable error indication after the read command is reissued. The memory address translation unit 306 may receive indication of the uncorrectable error and direct all the translated DRAM addresses related to the subsequent processor read requests to the second memory controller port 360.

In response to notification that the first data contains the first uncorrectable error, the first conflict queue 370 may place an entry in the Mirror Failover List 320. The existing scrub write located in the first write queue 311 may be updated to have dependency on the Mirror Failover Read completion for the scrub address. The logic in the Mirror Failover List 320 may schedule the confirmation read on the first memory controller port 308 (with dependency on completion of the scrub write). The logic may further schedule a Mirror Failover Read to the second memory controller port 360.

The Mirror Failover Read may be received at the second memory controller port 360 in the second read queue 322. The second memory controller port 360 may acknowledge receipt of the Mirror Failover Read to the first memory controller port 308. In response to the receipt, the first conflict queue 370 on the first memory controller port 308 may clear the entry related to the first read command. The second memory controller may assign one of the central data buffers 330 to the Mirror Failover Read. In response to receiving the Mirror Failover Read, the second command selection logic 324 may choose the second read command and forward the second read command to the second command/data packetizer 326 and the second conflict queue 328. From the second conflict queue 328, the second read command may be tracked. In a particular embodiment, the second command/data packetizer 326 issues the second read command to the second memory structure 380. Issuing the second read command to the second memory structure 380 may include transmitting the second read command to the second redrive device (not illustrated).

In response to the second read command, the second memory structure 380 may return the second data to the second memory controller port 360. At the second memory controller port 360, the second data is processed at the second memory read dataflow 334. Processing at the second memory read dataflow 334 may include checking ECC to determine if the second data contains any errors. The second conflict queue 328 may clear the entry related to the Mirror Failover Read and may indicate completion of the Mirror Failover Read to the first memory controller port 308. In response to the indication of completion of the Mirror Failover Read, the first write queue 311 may release the scrub write command.

The second memory read dataflow 334 may forward the second data to the central data buffer assigned to the Mirror Failover Read in response to determining that the second data does not contain any errors. The central data buffers 330 may return the second data to the requesting agent 304. The first memory controller port 308 may then pull the second data into the first local write data buffer 332. The first command/data packetizer 314 may packetize the repair write command and the second data. The packetized repair write command and the second data may then be transmitted by the first command/data packetizer 314 to the first memory structure 316. Upon completion of the scrub repair, the confirmation read may be dispatched from the first memory controller port 308 to check to see if the error still exists on the first memory structure 316. For instance, the first command/data packetizer 314 may issue the confirmation read command to the first memory structure 316. In response to the issued confirmation read command, the first memory read dataflow 318 may receive the third data.

In a particular embodiment, the ECC checking in the first memory read dataflow 318 may indicate whether the third data contains errors. If the repair action was successful and the third data does not contain any errors, the first memory controller port 308 may indicate to the address translation unit 306 to resume issuing the subsequent read commands to both memory controller ports. If the repair action was unsuccessful, the first memory controller port 308 may proceed with a hot memory replace. A hot memory replace may include replacing all of the data on the first memory structure 316 with all of the data on the second memory structure 380.

If the repair action was successful and the third data contains the second uncorrectable error then the first memory controller may proceed with a second repair action on the subsequent uncorrectable error. Alternatively, if the third data contains a single bit error, then redundant bit steering (RBS) may be invoked for a reported symbol indicated by the ECC. For example, if a hard error aligned with a soft error and the first repair action fixed the soft error, then the RBS may correct the hard error in the third data.

Repairing the first memory structure 316 with the second data retrieved in response to the second command allows the memory controller 302 to repair uncorrectable errors on a single address basis. In a particular embodiment, repairing a single address containing the uncorrectable error prevents the memory controller 302 from replacing data on the first memory structure 316 that may not contain uncorrectable errors, as occurs during the hot memory replace procedure. Replacing only data that is known to have an uncorrectable error increases the effectiveness of a repair action by reducing the amount of time required to perform the repair action.

Figure 4:
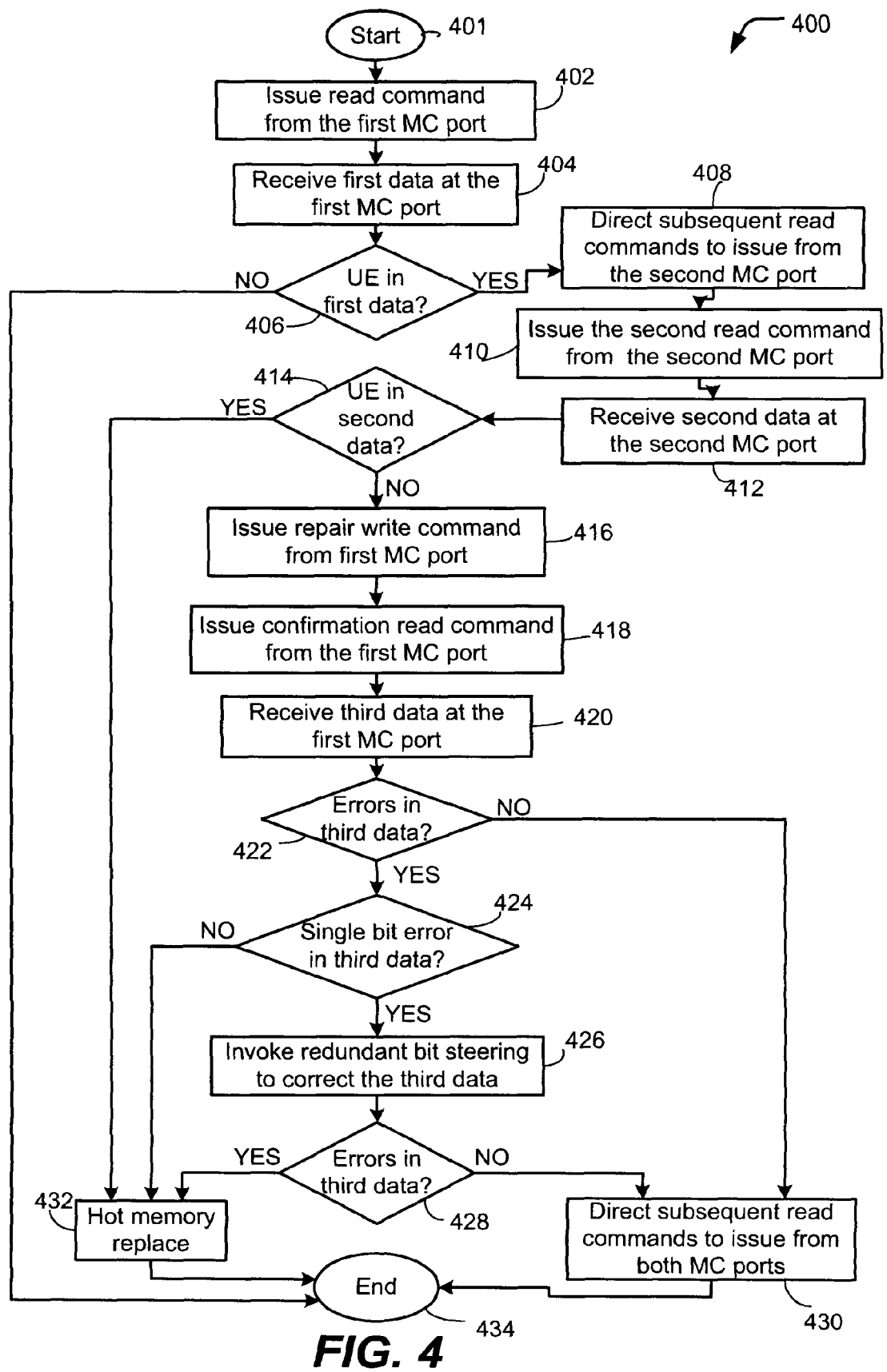
FIG. 4 is a flow diagram of a first embodiment of a method to respond to error detection.

Referring to FIG. 4, a diagram of a first embodiment of a method to respond to error detection is illustrated and is generally designated 400. The method 400 commences in state 401 and includes issuing a read command from a first memory controller port, at block 402. At block 404, first data may be received at the first memory controller port in response to the read command. At block 406, ECC within the first memory port may be used to determine whether there is an uncorrectable error in the first data. If there is not an uncorrectable error in the first data, then the logic may end at state 434.

Returning to block 406, if there is an uncorrectable error in the first data, subsequent read commands may be directed to issue from the second memory port at block 408. The read command is issued at block 410 as a second read command from the second memory port. Second data may be received at the second memory controller port at block 412. At block 414, the second data is examined to determine whether there is an uncorrectable error in the second data. If so, the first memory controller port may be instructed to perform a hot memory replace at block 432. The logic may end at state 434.

Returning to block 414, if the second data does not include an uncorrectable error, a repair write command may be issued at block 416 from the first memory controller port. At block 418, a confirmation read command may be issued from the first memory controller port. At block 420, third data may be received at the first memory controller port.

At block 422, ECC may be used to determine whether the third data includes an error. If the third data does not contain an error, the subsequent read commands are directed to issue from both the first memory controller port and the second memory controller port at block 430. The logic may end at state 434. Returning to block 422, if the third data does contain an error, the logic proceeds to block 424. At block 424, the memory controller may determine if the third data contains a single bit error. If the third data does contain an error that is not a single bit error, the logic proceeds to block 432 and performs a hot memory replace. The logic may end at state 434. Returning to block 424, if the third data does contain a single bit error, the logic proceeds to block 426 and redundant bit steering is invoked to correct the third data. At block 428, ECC checking indicates whether the corrected third data contains any errors. If the third data does include an error, the hot memory replace is performed at block 432. The logic may end at state 434. Returning to block 428, if the third data does not include an error, the memory controller directs at block 430 subsequent read commands to issue from both the first memory controller port and the second memory controller port. The logic may end at state 434.

Figure 5:
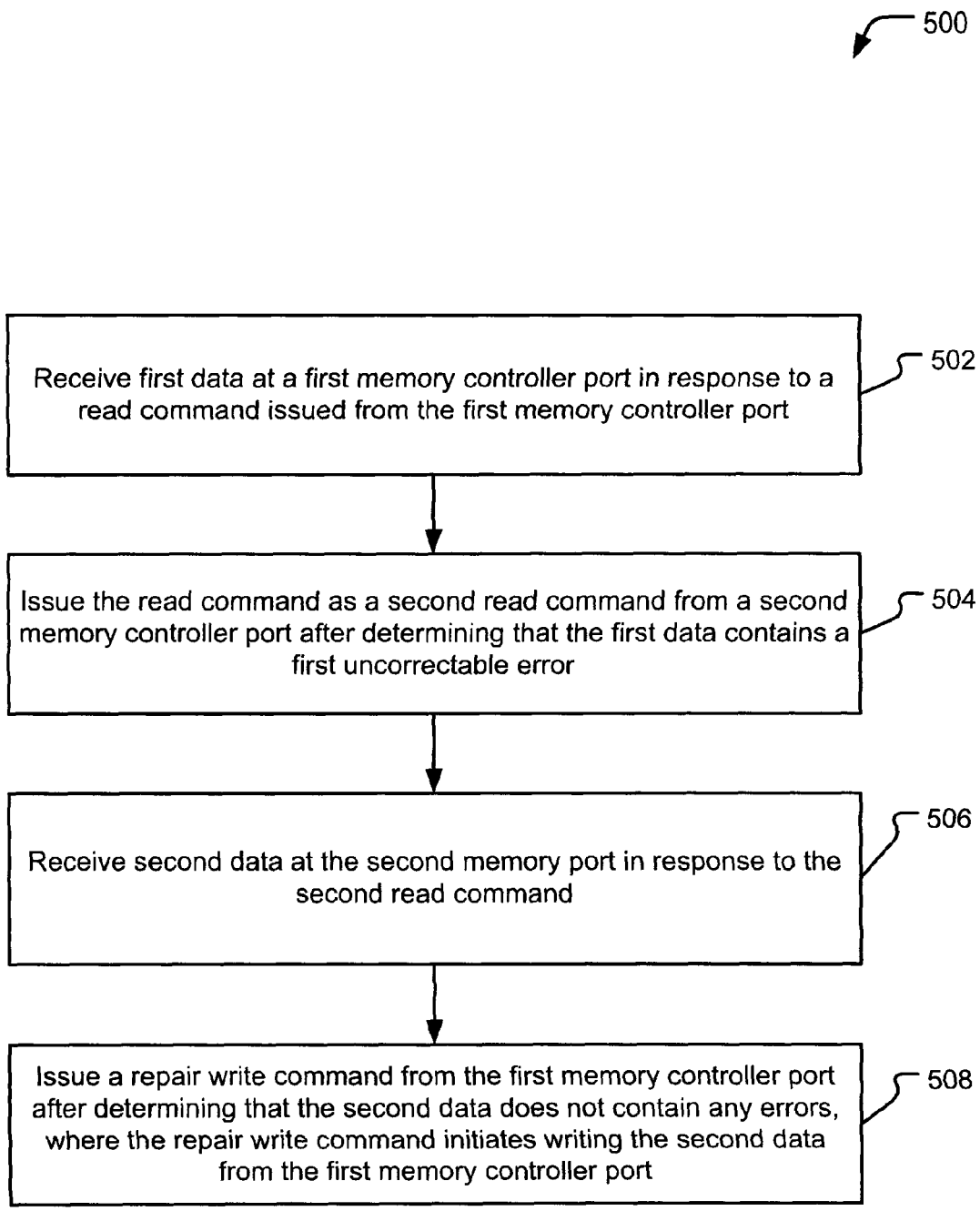
FIG. 5 is a flow diagram of a second embodiment of a method to respond to error detection.

FIG. 5 is a flow diagram of a second embodiment of a method to respond to error detection and is generally designated 500. In a particular embodiment, the method 500 is performed by any of the systems of FIGS. 1-3, or any combination thereof. The method 500 includes receiving first data at a first memory controller port in response to a read command issued from the first memory controller port, at block 502. For instance, the first memory controller 102 of FIGS. 1 and 2 receives first data 110 at the first memory controller port 104. In FIG. 3, the memory controller 302 receives first data at the first memory controller port 308.

The method 500 further may include issuing the read command as a second read command from a second memory controller port after determining that the first data contains a first uncorrectable error, at block 504. For example, the second memory controller port 106 of FIGS. 1 and 2 issues the read command as the second read command 114 after determining that the first data 110 includes the first uncorrectable error 112. As another example, the second memory controller port 360 of FIG. 3 issues a second read command after determining that the first data contains the uncorrectable error.

The method 500 further includes receiving second data at the second memory controller port in response to the second read command, at block 506. For example, the memory controller 102 of FIGS. 1 and 2 receives second data 116 at the second memory controller port 106 in response to the second read command 114. As another example, the second memory controller port 360 of FIG. 3 receives second data in response to the second read command.

The method 500 further includes issuing at block 508 a repair write command from the first memory controller port after determining that the second data does not contain any errors. The repair write command may initiate writing the second data from the first memory controller port. For example, the memory controller 102 of FIGS. 1 and 2 issues a repair write command 118 from the first memory controller port 104 after determining that the second data 116 does not contain any errors. The repair write command 118 may initiate writing the second data 116 from the first memory controller port 104. As another example, the first memory controller port 308 of FIG. 3 issues the repair write command after determining the second data does not contain any errors.

Figure 6:
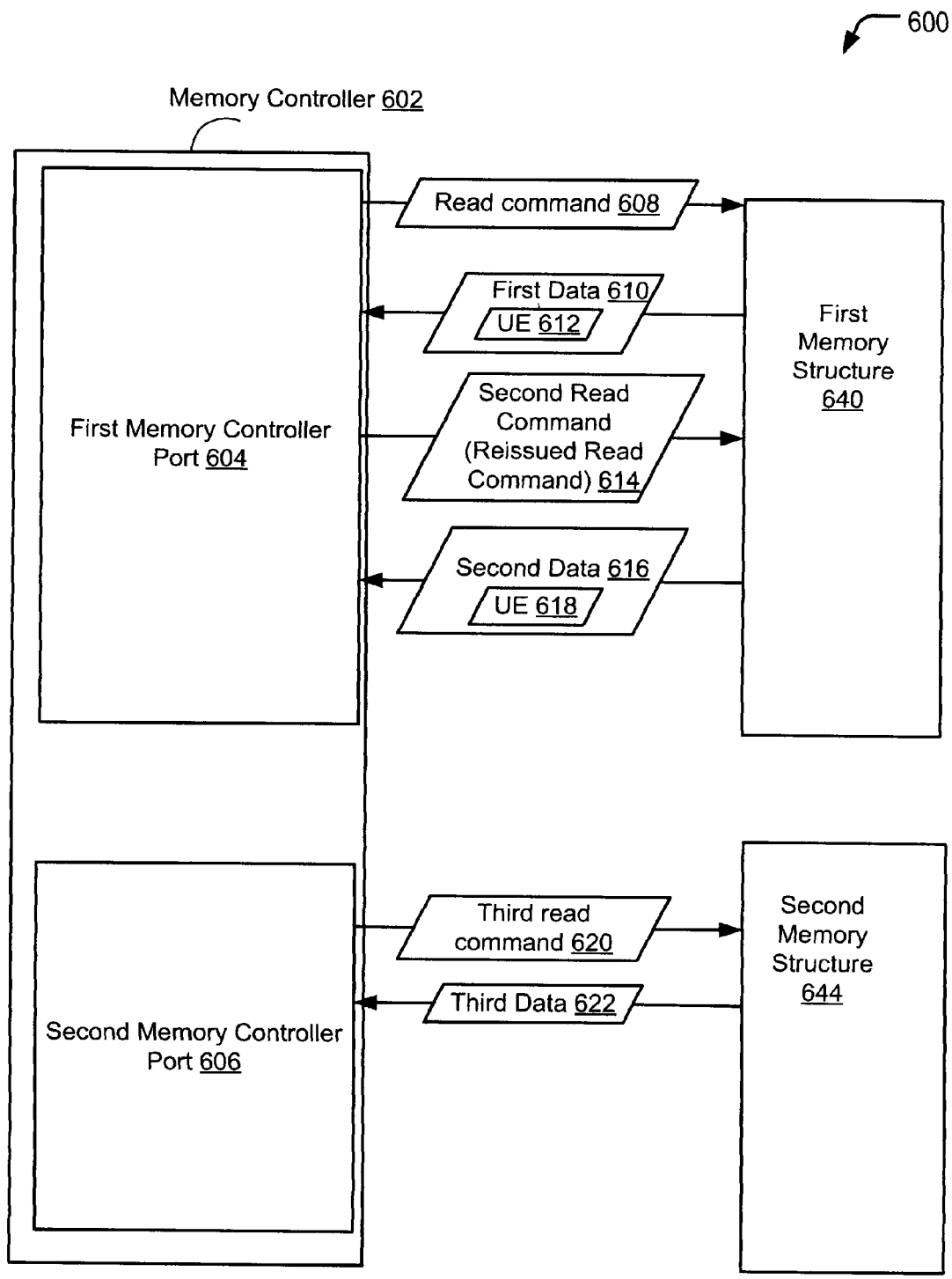
FIG. 6 is a block diagram of a fourth embodiment of a system to respond to error detection.

FIG. 6 is a diagram of a fourth embodiment of a system to respond to error detection and is generally designated 600. The system 600 includes a first memory structure 640, a second memory structure 644, and a memory controller 602 with a first memory controller port 604 and a second memory controller port 606. The first memory controller port 604 is connected to the first memory structure 640, and the second memory controller port 606 is connected to the second memory structure 644.

Generally, the memory controller 602 may attempt to retry a command when the command results in data with an uncorrectable error. By retrying the command, the memory controller 602 may avoid a repair action by determining that the first uncorrectable error 612 was due to a non-persistent condition. Reducing the instances where the repair action must be performed increases the efficiency of the system 600.

The memory controller 602 may be configured to receive first data 610 at the first memory controller port 604 in response to a read command 608 issued from the first memory controller port 604. The memory controller 602 may be configured to reissue the read command 608 as a second read command 614 from the first memory controller port 604 after determining that the first data 610 contains an uncorrectable error. The memory controller 602 may be configured to receive second data 616 at the first memory controller port 604 in response to the second read command 614. In a particular embodiment, the memory controller 602 may be configured to issue a third command 620 from the second memory controller port 606 after determining that the second data 616 contains a second uncorrectable error 618. The memory controller 602 may be configured to receive third data 622 at the second memory controller port 606 in response to the third read command 620.

The memory controller 602 may issue a read command 608 from the first memory controller port 604. The read command 608 may direct the first memory structure 640 to return data at a first address specified in the read command 608. For example, in response to receiving the read command 608, the first memory structure 640 may retrieve the first data 610 at the first address and transmit the first data 610 to the first memory controller port 604. The memory controller 602 may receive the first data 610 at the first memory controller port 604. The first memory controller port 604 may include logic that checks the first data 610 for errors and produces ECCs. For instance, ECC checking may indicate that the first data 610 contains a multi-bit error by producing an ECC indicating the first data 610 contains a first uncorrectable error 612.

The memory controller 602 may respond to the detection of the first uncorrectable error 612 in the first data 610 by attempting to retrieve good data from the first memory structure 640 through a reissue of the read command 608. For example, the memory controller 602 may reissue the read command 608 as the second read command 614 from the first memory controller port 604. Reissuing the read command 608 to the same port may allow the first memory controller port 604 to retrieve good data. Such may be the case where the first data 610 contained the first uncorrectable error 612 due to a condition that is no longer affecting the system 600 during the transmission of the second command 614. For instance, the errors that cause the first uncorrectable error 612 may be transient due to signal quality issues or alignment of several factors at a given moment in time.

The memory controller 602 may queue the second command 614 for a preset amount of time to create an opportunity for conditions within the system to change. For example, the first memory controller port 604 may place the second command 614 in a read retry list queue with dependency upon a preset amount of time passing before the second command 614 is issued.

The first memory structure 640 may retrieve second data 616 in response to the second command 614 and transmit the second data 616 to the first memory controller port 604. The first memory controller port 604 may perform ECC checking on the second data 616 to determine whether the second data 616 contains errors. The ECC checking indicates that the second data 616 contains an uncorrectable error (e.g., a second uncorrectable error 618).

In response to determining that the second data 616 contains the second uncorrectable error 618, the memory controller 602 may issue a third read command 620 from the second memory controller port 606. The second memory structure 644 may be a mirror copy of the first memory structure 640. In this case, data retrieved by the second memory structure 644 in response to the third read command 620 is a mirror copy of the data that should be in the first address of the first memory structure 640. For instance, the second memory structure 644 may retrieve the third data 622 in response to the third read command 620 and transmit the third data 622 to the second memory controller port 606. The memory controller 602 may receive the third data 622 at the second memory controller port 606.

Reattempting to retrieve good data from the first address on the first memory structure 640 before attempting to retrieve the data from a mirror copy may allow the memory controller 602 to confirm that the first uncorrectable error 612 was not the result of a condition that only momentarily affected the system. Preventing unnecessary repairs or access of a mirror memory structure (e.g., the second memory structure 644) before confirming that the first uncorrectable error 612 is persistent reduces memory latency and improves overall system efficiency and performance.

Figure 7:
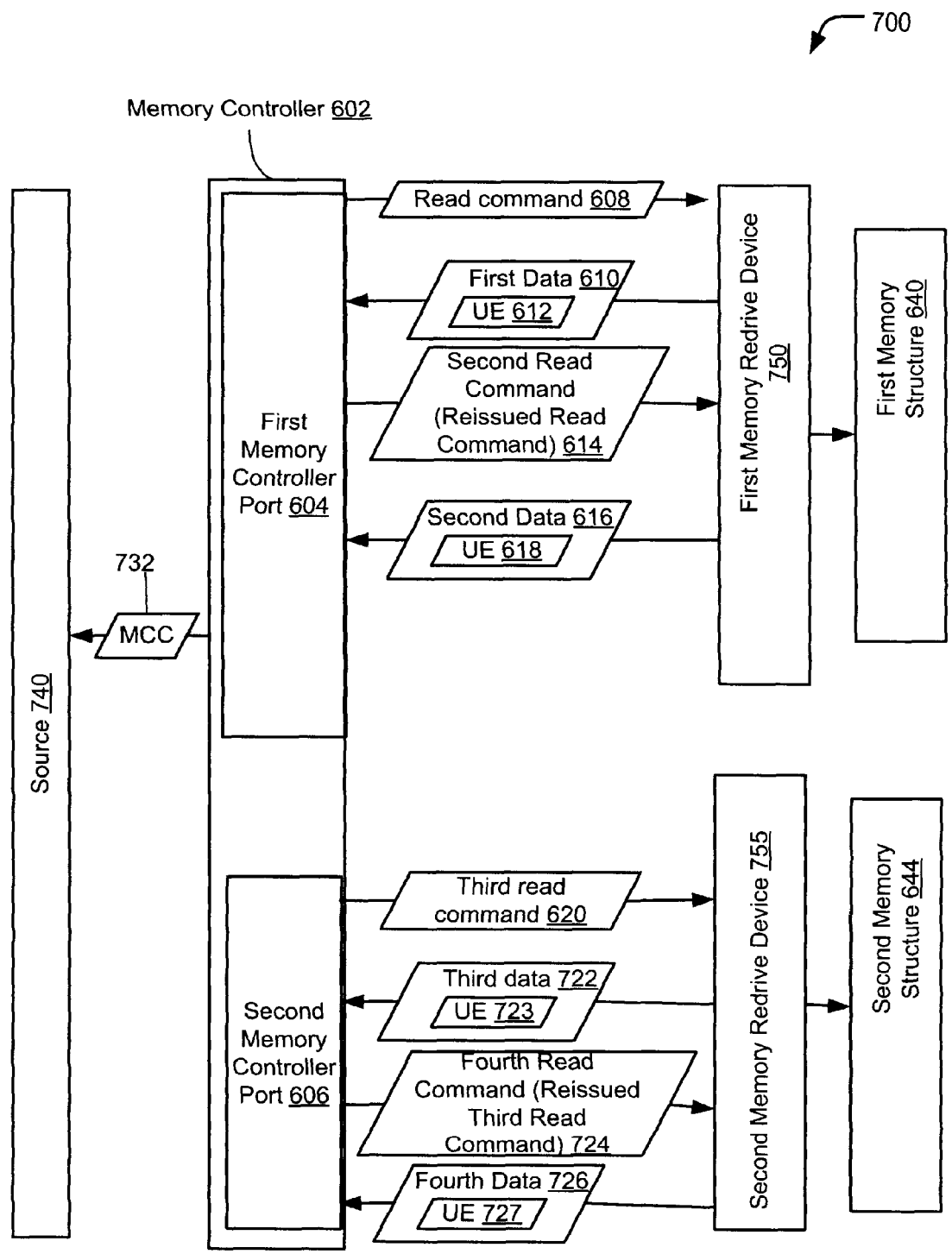
FIG. 7 is a block diagram of a fifth embodiment of a system to respond to error detection.

Referring to FIG. 7, a diagram of another embodiment of a system to respond to error detection is illustrated and generally designated 700. The system 700 may include components present in the system 600 of FIG. 6, where similar components have the same reference number. In addition to the components of system 600, the system 700 includes a first memory redrive device 750, a second memory redrive device 755, and a source 740.

The memory controller 602 may issue a read command 608 from the first memory controller port 604. The read command 608 may direct the first memory structure 640 to return data at a first address specified in the read command 608. For example, in response to receiving the read command 608, the first memory structure 640 may retrieve first data 610 at the first address and transmit the first data 610 to the first memory controller port 604.

The memory controller 602 may receive the first data 610 at the first memory controller port 604. The first memory controller port 604 may include logic that checks the first data 610 for errors and produces ECCs. For instance, ECC checking may indicate that the first data 610 contains a multi-bit error, and as a result, produce an ECC indicating the first data 610 contains the first uncorrectable error 612.

The memory controller 602 responds to the detection of the first uncorrectable error 612 in the first data 610 by attempting to retrieve good data from the first memory structure 640 through a reissue of the read command 608. For example, the memory controller 602 may reissue the read command 608 as a second read command 614 from the first memory controller port 604. Reissuing the read command 608 to the same port may allow the first memory controller port 604 to retrieve good data. Such may be the case where the first data 610 contained the first uncorrectable error 612 due to a condition that is no longer affecting the system 600 during the transmission of the second command 614. For instance, a disruption in the transmission medium between the first memory controller port 604 and the first memory structure 640 may cease before the second command 614 is received by the first memory structure 640.

The memory controller 602 may queue the second command 614 for a preset amount of time to create an opportunity for conditions within the system to change. For example, the first memory controller port 604 may place the second command 614 in a read retry list queue with dependency upon a preset amount of time passing before the second command 614 is issued.

The first memory structure 640 may retrieve the second data 616 in response to the second command 614 and transmits the second data 616 to the first memory controller port 604. The first memory controller port 604 may perform ECC checking on the second data 616 to determine whether the second data 616 contains errors. ECC checking may indicate that the second data 616 contains an uncorrectable error (e.g., a second uncorrectable error 618).

In response to determining that the second data 616 contains the second uncorrectable error 618, the memory controller 602 may issue a third read command 620 from the second memory controller port 606. The second memory structure 644 is a mirror copy of the first memory structure 640. Data retrieved by the second memory structure 644 in response to the third read command 620 is a mirror copy of the data that should be in the first address of the first memory structure 640. For instance, the second memory structure 644 may retrieve the third data 722 in response to the third read command 620 and transmit the third data 722 to the second memory controller port 606. The memory controller 602 may receive the third data 722 at the second memory controller port 606.

The memory controller 602 may receive the third data 722 at the second memory controller port 606 in response to the third read command 620. In a particular embodiment, the memory controller 602 determines that the third data 722 contains a third uncorrectable error 723. For example, ECC checking performed at the second memory controller port 606 may indicate that the third data 722 includes the third uncorrectable error 723. The memory controller 602 may reissue the third read command 620 as a fourth read command 724 from the second memory controller port 606 after determining that the third data 722 contains the third uncorrectable error 723.

The fourth read command 724 may include an uncorrectable error retry read command. The uncorrectable error retry read command may be used as a last effort for recovery. For instance, the memory controller 602 may receive fourth data 726 at the second memory controller port 606 in response to the fourth read command 724. The memory controller 602 may determine that the fourth data 726 contains a fourth uncorrectable error 727. Unlike cyclic redundancy check (CRC) errors that may be retried indefinitely, an uncorrectable error on the uncorrectable error retry read command will result in a machine check condition 732. The memory controller 602 may issue a machine check condition 732 to the source 740 after determining that the fourth data 726 contains the fourth uncorrectable error 727.

Trying again to retrieve good data from the first address on the first memory structure 640 before attempting to retrieve the data from a mirror copy allows the memory controller 602 to confirm that the first uncorrectable error 612 was not the result of a condition that may have only momentarily affected the system. However, if the memory controller 602 does use the mirror copy (e.g., the second memory structure 644), the memory controller 602 may improve efficiency by retrying any commands on the second memory structure 644 that also result in an uncorrectable error (e.g., the third uncorrectable error). Preventing unnecessary repairs or access of the memory structures before confirming that the first uncorrectable error 612 is persistent reduces memory latency and improves overall system efficiency and performance.

Figure 8:
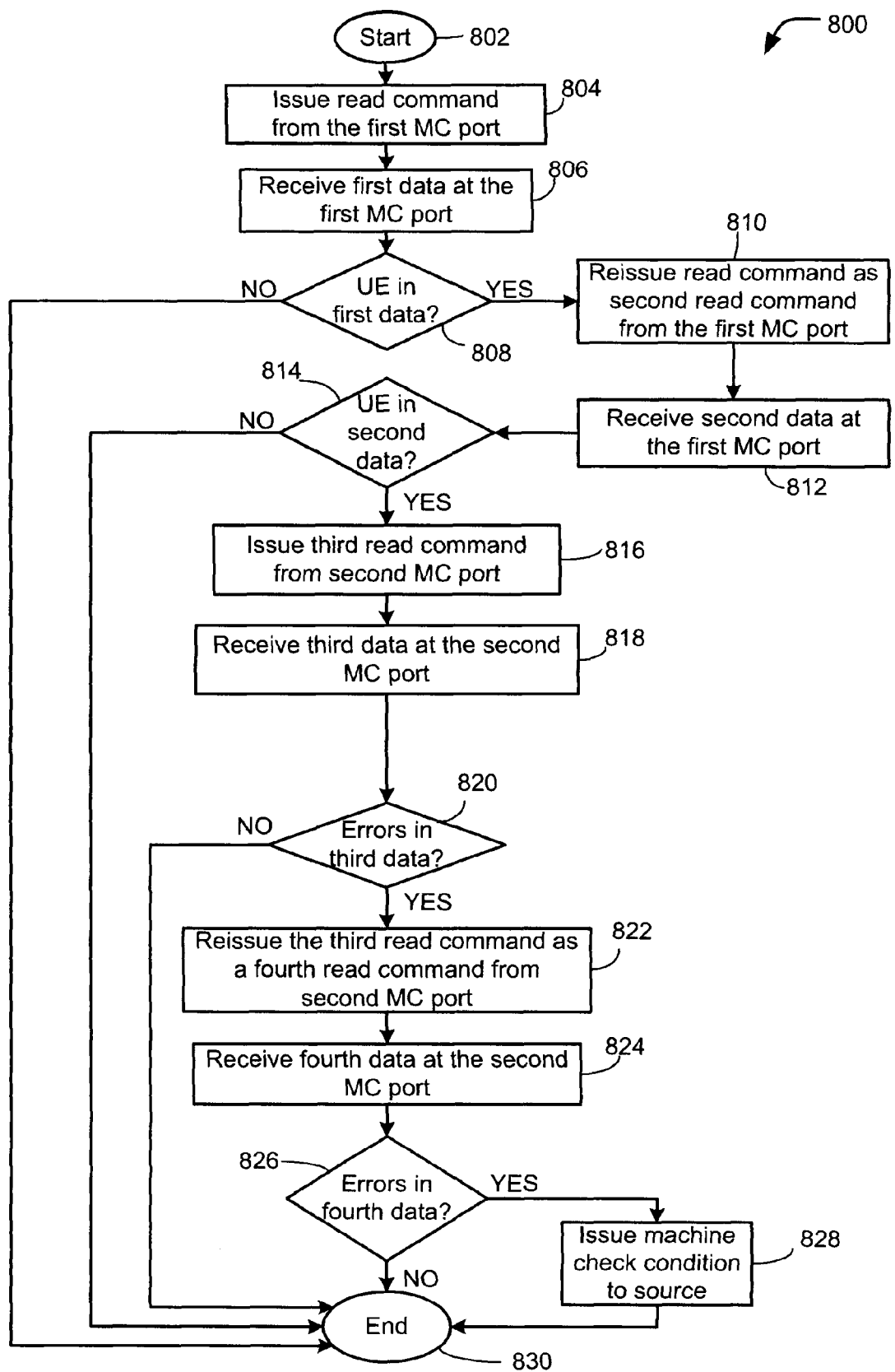
FIG. 8 is a flow diagram of third embodiment of a method to respond to error detection.

Referring to FIG. 8, a diagram of a third embodiment of a method to respond to error detection is illustrated and generally designated 800. The method 800 commences in state 802 and issues at block 804 a read command from a first memory controller port. At block 806, first data is received at the first memory controller port in response to the read command. At block 808, ECC within the first memory port may determine whether there is an uncorrectable error in the first data. If there is not an uncorrectable error in the first data, then the logic ends at state 830. If there is an uncorrectable error in the first data, the read command may be reissued at block 810 as a second read command from the first memory controller port.

Second data may be received at the first memory controller port, at block 812. At block 814, ECC within the first memory controller port may determine whether there is an uncorrectable error in the second data. If there is not an uncorrectable error in the second data, then the logic ends at state 830. If there is an uncorrectable error in the second data, the third command is issued from the second memory controller port, at block 816.

Third data may be received at the second controller port in response to the third read command, at block 818. At block 820, ECC within the second memory controller port determines whether there is an uncorrectable error in the third data. If there is not an uncorrectable error in the third data, then the logic ends at state 830. If there is an uncorrectable error in the third data, the third read command is reissued as a fourth read command from the second memory controller port, at block 822.

At block 824, the memory controller may receive fourth data at the second memory controller port in response to the fourth read command. At block 826, ECC within the second memory controller port may determine whether there is an uncorrectable error in the fourth data. If so, the memory controller may issue a machine check condition to a source at block 828. The logic may end at state 830. Returning to block 826, if there is not an uncorrectable error in the fourth data, the logic ends at state 830.

Retrying to retrieve good data from the first address on the first memory structure before attempting to retrieve the data from a mirror copy may allow the memory controller to confirm that the uncorrectable error was not the result of a condition that may have only momentarily affected the system. However, if the memory controller does use the mirror copy (e.g., the second memory structure), the memory controller may improve efficiency by retrying any commands that also result in an uncorrectable error. Preventing unnecessary repairs or access of the memory structures before confirming that the uncorrectable error is persistent reduces memory latency and improves overall system efficiency and performance.

Figure 9:
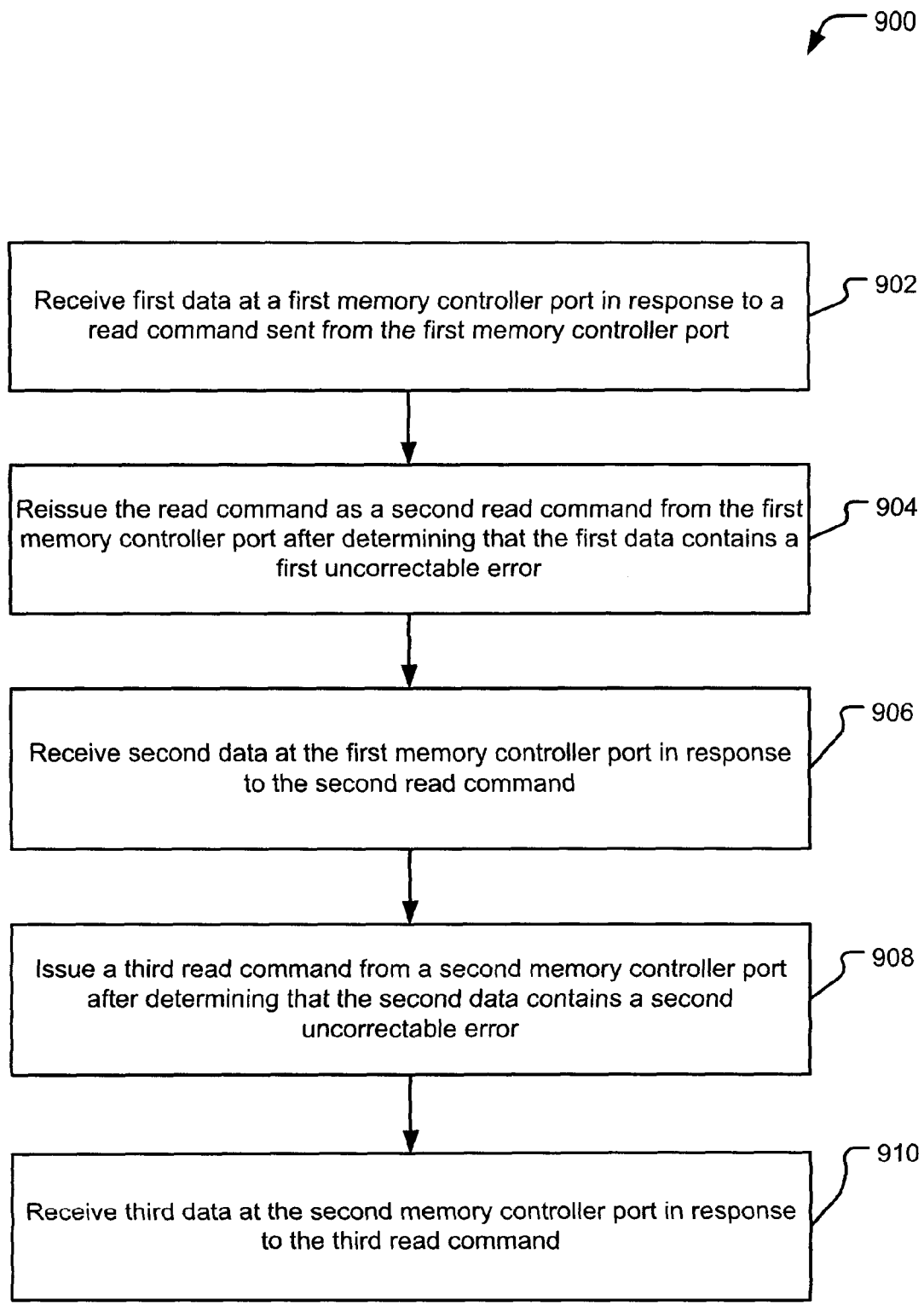
FIG. 9 is a flow diagram of a fourth embodiment of a method to respond to error detection.

FIG. 9 is a flow diagram of a fourth embodiment of a method 900 to respond to error detection. In a particular embodiment, the method 900 may be performed by any of the systems of FIGS. 6 and 7, or any combination thereof. The method 900 includes receiving first data at a first memory controller port in response to a read command sent from the first memory controller port, at block 902. For example, the memory controller 602 of FIGS. 6 and 7 may receive first data 610 at the first memory controller port 604 in response to the read command 608 sent from the first memory controller port 604.

The method 900 may also include reissuing the read command as a second read command from the first memory controller port after determining that the first data contains an uncorrectable error, at block 904. For instance, the memory controller 602 may reissue the read command 608 as a second read command 614 from the first memory controller port 604 after determining that the first data 610 contains an uncorrectable error 612. The method 900 may also include receiving second data at the first memory controller port in response to the second read command, at block 906. For example, the memory controller 602 may receive the second data 616 at the first memory controller port 604 in response to the second read command 614.

The method 900 may also include issuing a third read command from a second memory controller port after determining that the second data contains a second uncorrectable error, at block 908. For instance, the memory controller 602 may issue the third read command 620 from the second memory controller port 604 after determining that the second data 616 contains the second uncorrectable error 618.

The method 900 may also include receiving third data at the second memory controller port in response to the third read command, at 910. For example, the memory controller 602 may receive the third data 622 at the second memory controller port 606 in response to the third read command 620.

Figure 10:
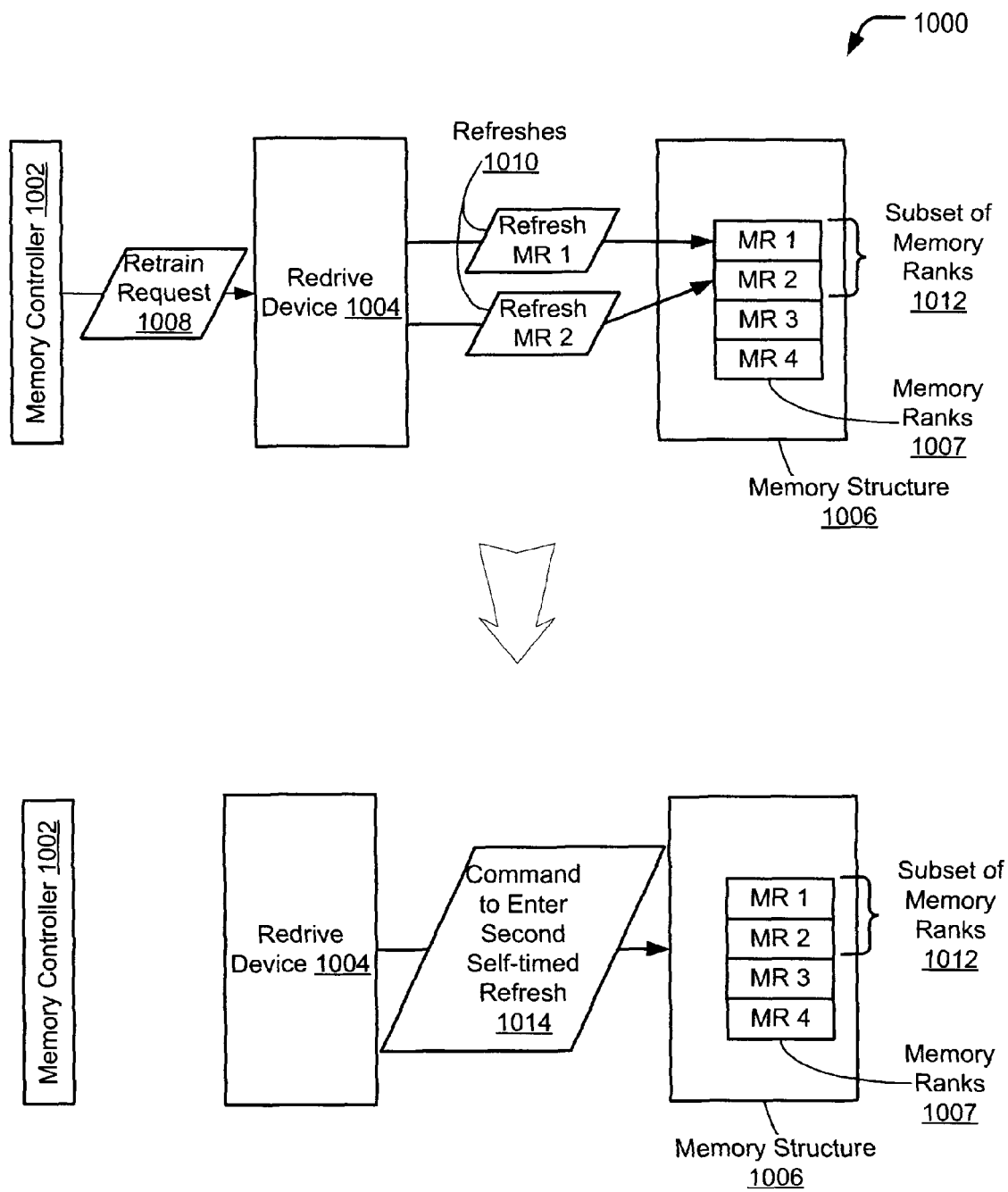
FIG. 10 is a block diagram of a sixth embodiment of a system to respond to error detection.

FIG. 10 is a diagram of another embodiment of a system to respond to error detection and is generally designated 1000. The system 1000 includes a memory controller 1002, a redrive device 1004, and a memory structure 1006 containing memory ranks 1007. The memory controller 1002 and the redrive device 1004 may be connected via a high speed link. The high speed link may refer to two unidirectional high speed links with CRC error coverage.

The redrive device 1004 may be configured to receive a retrain request 1008 from the memory controller 1002. The redrive device 1004 may be implemented as a buffer-on-board the memory structure 1006. The redrive device 1004 may be configured to issue refreshes 1010 to a subset 1012 of memory ranks 1007 that have not received a refresh subsequent to the memory ranks 1007 exiting a first self-timed refresh mode. The redrive device 1004 may be configured to issue a command 1014 instructing the memory ranks 1007 to enter a second self-timed refresh mode.

The memory controller 1002 may detect a transmission error over the high speed link that requires the high speed link to be retrained. For instance, the redrive device 1004 may receive a command from the memory controller 1002 that contains an error. The redrive device 1004 transmits alert frames to the memory controller 1002 to indicate the error. The memory controller 1002 may determine that the high speed link needs to be retrained in order for the transmission of commands and data over the high speed link to resume. In response to determining that the high speed link needs to be retrained, the memory controller 1002 may transmit the retrain request 1008 to the redrive device 1004.

Upon receiving the retrain request 1008, the redrive device 1004 may issue refreshes 1010 to the subset 1012 of the memory ranks 1007 that have not received a refresh subsequent to the memory ranks 1007 exiting a first self-time refresh mode. For example, after the memory ranks 1007 exit the first self-timed refresh mode, the memory controller 1002 may send refreshes 1010 to seventy-five percent of the memory ranks 1007. Upon receiving the retrain request 1008, the redrive device 1004 may send refreshes 1010 to the twenty-five percent of the memory ranks 1007 that did not receive refreshes 1010 subsequent to the memory ranks 1007 exiting the first self-timed refresh mode.

The redrive device 1004 may refresh the memory ranks 1007 that did not receive refreshes 1010 subsequent to the memory ranks 1007 exiting the first self-timed refresh mode. The redrive device 1004 may then issue a command 1014 instructing the memory ranks 1007 to enter a second self-timed refresh mode. By refreshing the subset 1012 of the memory ranks 1007 that have not received refreshes 1010 subsequent to the memory structure 1006 exiting the first self-timed refresh mode, the memory ranks 1007 may receive at least the minimum number of refreshes 1010 required between exiting the first self timed refresh mode and entering a second self-timed refresh mode.

Figure 11:
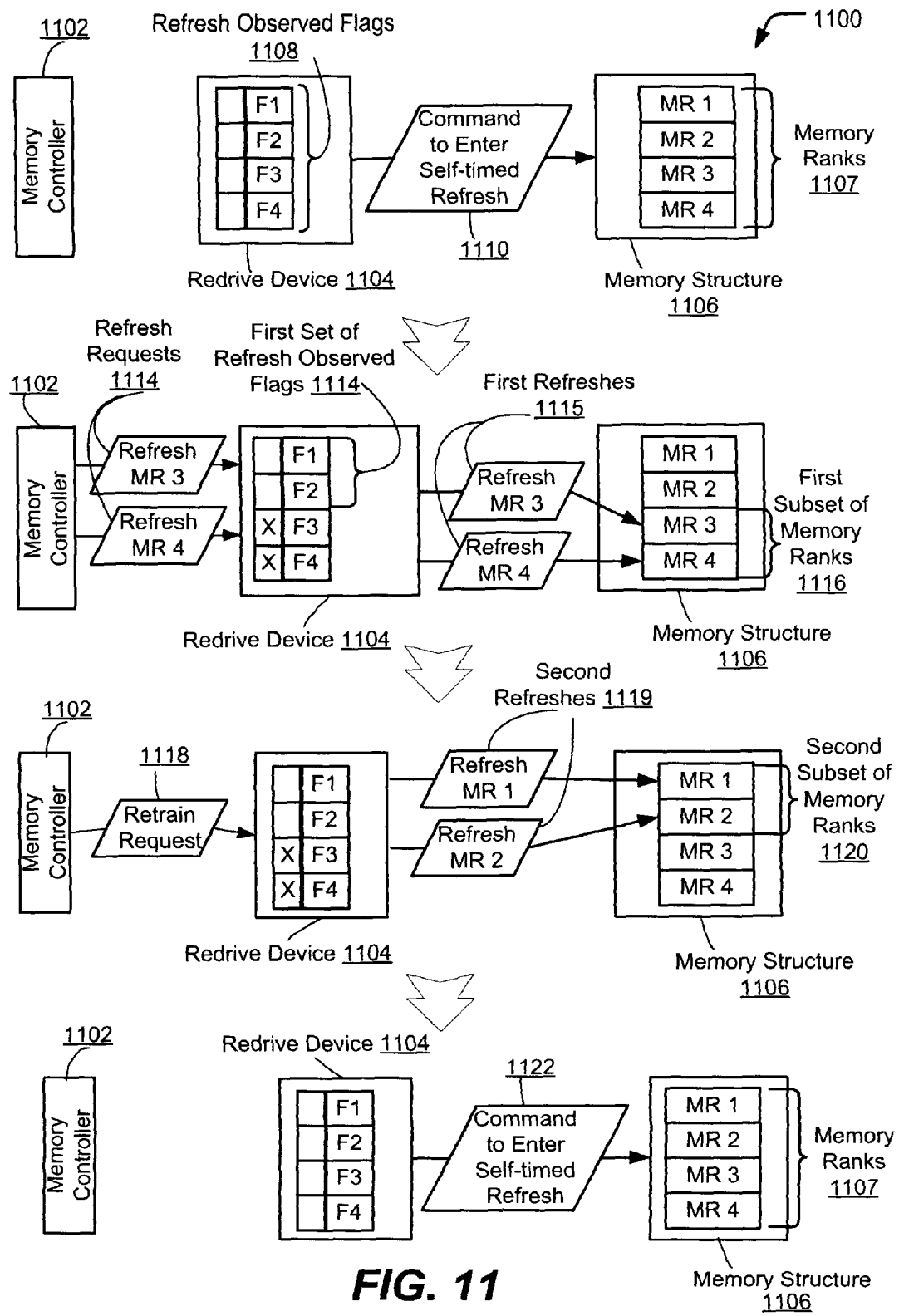
FIG. 11 is a block diagram of a seventh embodiment of a system to respond to error detection.

FIG. 11 is a diagram of another embodiment of a system to respond to error detection and is generally designated 1100.

The system 1100 includes a memory controller 1102 connected to a redrive device 1104 that is connected to a memory structure 1106 containing memory ranks 1107. The memory controller 1102 and the redrive device 1104 are connected via a high speed link. The high speed link may refer to two unidirectional high speed links with CRC error coverage.

The redrive device 1104 may be configured to receive a retrain request 1118 from the memory controller 1102. The redrive device 1104 may be implemented as a buffer-on-board the memory structure 1106. The redrive device 1104 may be configured to issue refreshes to a subset of memory ranks 1107 that have not received a refresh subsequent to the memory ranks 1107 exiting a first self-timed refresh mode. In a particular embodiment, the redrive device 1104 is configured to issue a command 1122 instructing the memory ranks 1107 to enter a second self-timed refresh mode.

The redrive device 1104 may maintain refresh observed flags 1108 that correspond to the memory ranks 1107. In a particular embodiment, each refresh observed flag indicates whether an individual memory rank has received a refresh subsequent to the memory ranks 1107 exiting a first self-time refresh mode. The redrive device 1104 may clear all of the refresh observed flags 1108 after sending a command 1110 to the memory ranks 1107 to enter the first self-timed refresh mode. A cleared refresh observed flag may indicate that the corresponding memory rank has not been refreshed subsequent to a previous self-timed refresh mode.

Subsequent to the memory ranks 1107 exiting the first self-time refresh mode, the redrive device 1104 may receive refresh requests 1112 from the memory controller 1102. In response to receiving the refresh requests 1112, the redrive device 1104 may set a first subset 1114 of the refresh observed flags 1108 that correspond to the subset 1116 of the memory ranks 1107. The subset 1116 of the memory ranks 1107 may, in turn, correspond to the refresh requests 1112. After setting the first subset 1114 of the refresh observed flags 1108, the redrive device 1104 may issue first refreshes 1115 to a first subset 1116 of the memory ranks 1107 that correspond to the refresh requests 1112.

The memory controller 1102 may detect a transmission error over the high speed link that requires the high speed link to be retrained. For instance, the redrive device 1104 may receive a command from the memory controller 1102 that contains an error. The redrive device 1104 may transmit alert frames to the memory controller 1102. The memory controller 1102 may determine that the high speed link needs to be retrained in order for the transmission of commands and data over the link to resume. In response to determining that the high speed link needs to be retrained, the memory controller 1102 may transmit the retrain request 1118 to the redrive device 1104.

In response to receiving the retrain request 1118, the redrive device 1104 may issue second refreshes 1119 to a second subset 1120 of the memory ranks 1107. The second subset 1120 of the memory ranks 1107 have not received a refresh subsequent to the memory ranks 1107 exiting a first self-time refresh mode. The redrive device 1104 determines the second subset 1120 of the memory ranks 1107 that have not received a refresh subsequent to the memory ranks 1107 exiting the first self-timed refresh mode. This determination may be based on the refresh observed flags 1108. For example, the redrive device 1104 may issue the second set 1119 of refreshes to the memory ranks 1107 that correspond to refresh observed flags 1108 that are not set.

After issuing the second set 1119 of refreshes, the redrive device 1104 may issue a command 1122 instructing the memory ranks 1107 to enter a second self-timed refresh mode. In response to issuing the command 1122 instructing the memory ranks 1107 to enter the second self-timed refresh mode, the redrive device 1104 may clear the refresh observed flags 1108. By refreshing the subset of the memory ranks 1107 that have not received refreshes subsequent to the memory structure 1106 exiting the first self-timed refresh mode, the memory ranks 1107 may receive at least the minimum number of refreshes required between exiting the first self timed refresh mode and entering a second self-timed refresh mode.

Figure 12:
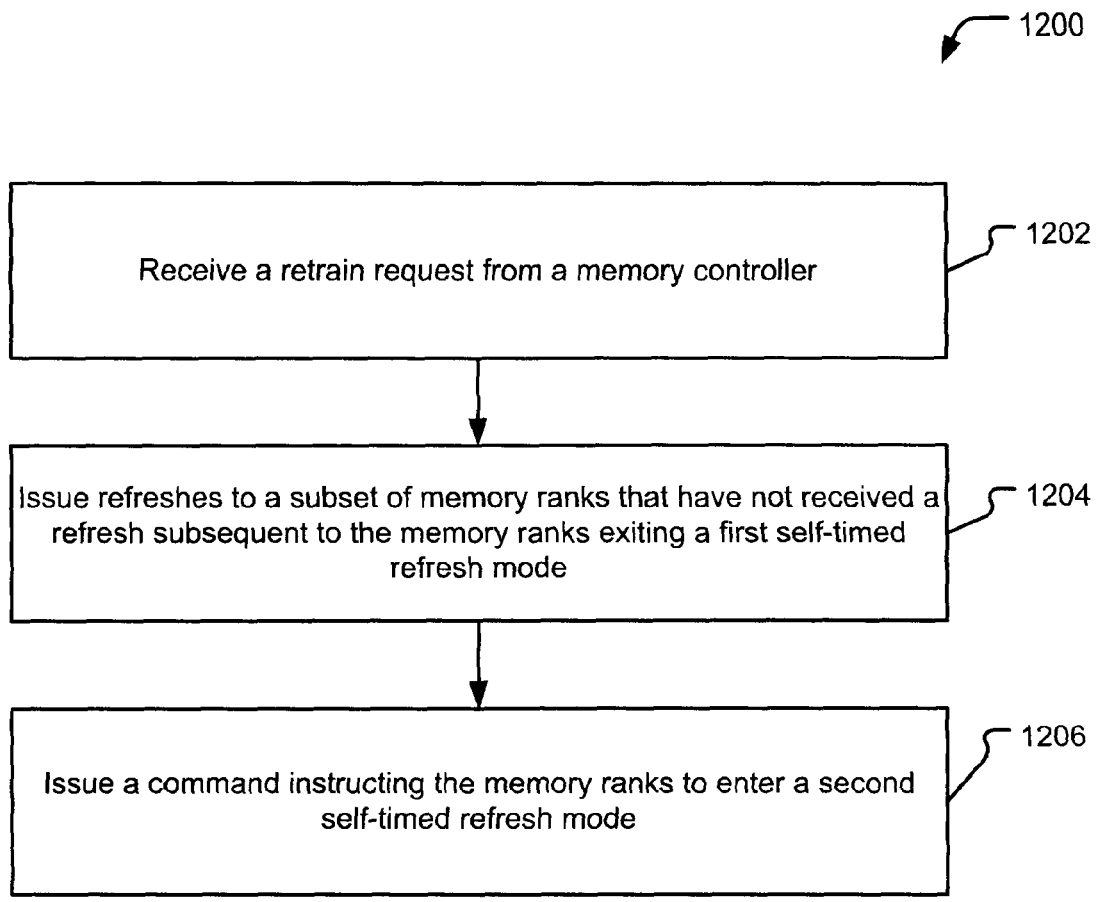
FIG. 12 is a flow diagram of a fifth embodiment of a method to respond to error detection.

FIG. 12 is a flow diagram of a fifth embodiment of a method 1200 to issue refreshes. The method 1200 may be performed by any of the systems of FIGS. 10 and 11, or any combination thereof. The method 1200 includes receiving a retrain request from a memory controller, at block 1202. For instance, the redrive device 1004 of FIG. 10 may receive the retrain request 1008 from the memory controller 1002. As another example, the redrive device 1104 of FIG. 11 receives the retrain request 1118 from the memory controller 1102.

The method 1200 also includes issuing refreshes to a subset of memory ranks that have not received a refresh subsequent to the memory ranks exiting a first self-timed refresh mode, at block 1204. For instance, the redrive device 1004 of FIG. 10 issues refreshes 1010 to a subset 1012 of the memory ranks 1007 that have not received a refresh subsequent to the memory ranks 1007 exiting a first self-timed refresh mode. As another example, in FIG. 11 the redrive device 1104 may issue the second set of refreshes 1119 to the second subset 1120 of the memory ranks 1107. The second subset 1120 of the memory ranks 1107 have not received a refresh subsequent to the memory ranks 1107 exiting a first self-timed refresh mode.

The method 1200 may also include issuing a command instructing the memory ranks to enter a second self-timed refresh mode, at block 1206. For example, the redrive device 1004 of FIG. 10 issues a command 1014 instructing the memory ranks 1007 to enter a second self-timed refresh mode. As another example, the redrive device 1104 of FIG. 11 issues a command 1122 instructing the memory ranks 1107 to enter a second self-timed refresh mode.

Particular embodiments can take the form of an entirely hardware embodiment, an entirely software embodiment or an embodiment containing both hardware and software elements. In a particular embodiment, the disclosed methods are implemented in software, which includes but is not limited to firmware, resident software, microcode, etc.

Further, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disc—read only memory (CD-ROM), compact disc—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus, method, and illustrative examples shown and described. Accordingly, departures may be made from such details without departing from the spirit or scope of Applicants' general inventive concept.

The invention claimed is:

1. A method of responding to error detection, the method comprising:
   receiving first data at a first memory controller port in response to a first read command issued from the first memory controller port;
   issuing a second read command from a second memory controller port after determining that the first data contains a first uncorrectable error;
   receiving second data at the second memory controller port in response to the second read command; and
   issuing a repair write command from the first memory controller port after determining that the second data does not contain any errors, wherein the repair write command initiates writing the second data from the first memory controller port.

2. The method of claim 1, further comprising issuing a confirmation read command from the first memory controller port after the repair write command is issued from the first memory controller port.

3. The method of claim 2, further comprising receiving third data in response to the confirmation read command issued from the first memory controller port.

4. The method of claim 3, further comprising invoking redundant bit steering to correct the third data in response to detecting that the third data has a single bit error.

5. The method of claim 3, further comprising issuing a subsequent read command from at least one of the first memory controller port and the second memory controller port after determining that the third data does not contain any errors.

6. The method of claim 1, further comprising directing a subsequent read command to issue from the second memory controller port in response to determining that the first data contains the uncorrectable error.

7. The method of claim 1, wherein the first memory controller port is connected to a first memory structure and the second memory controller port is connected to a second memory structure.

8. The method of claim 7, wherein the second memory structure is configured to mirror the first memory structure.

9. The method of claim 8, further comprising issuing a hot memory replace of the first memory structure with data from the second memory structure after determining that third data contains a second uncorrectable error.

10. A method of responding to error detection, the method comprising:
    receiving first data at a first memory controller port in response to a read command sent from the first memory controller port;
    reissuing the read command as a second read command from the first memory controller port after determining that the first data contains an uncorrectable error;
    receiving second data at the first memory controller port in response to the second read command;
    issuing a third read command from a second memory controller port after determining that the second data contains a second uncorrectable error; and
    receiving third data at the second memory controller port in response to the third read command.

11. The method of claim 10, further comprising reissuing the third read command as a fourth read command from the second memory controller port after determining that the third data contains a third uncorrectable error.

12. The method of claim 11, wherein the fourth read command includes an uncorrectable error retry read command.

13. The method of claim 12, further comprising receiving fourth data at the second memory controller port in response to the fourth read command.

14. The method of claim 13, further comprising issuing a machine check condition to a source after determining that the fourth data contains a fourth uncorrectable error.

15. The method of claim 10, wherein the first memory controller port is connected to a first memory redrive device and the second memory controller port is connected to a second memory redrive device, wherein the first memory redrive device is connected to a first memory structure and the second memory redrive device is connected to a second memory structure.

16. A method comprising:
    receiving, in response to a detected error, a retrain request from a memory controller;
    issuing a first command to refresh a subset of a plurality of memory ranks that have not received a refresh subsequent to the plurality of memory ranks exiting a first self-timed refresh mode; and
    issuing a second command instructing the plurality of memory ranks to enter a second self-timed refresh mode, wherein the second command is different from the first command.

17. The method of claim 16 further comprising maintaining a refresh observed flag that corresponds to a memory rank of the plurality of memory ranks, wherein the refresh observed flag indicates whether the memory rank has received the refresh subsequent to the plurality of memory ranks exiting the first self-time refresh mode.

18. The method of claim 17, further comprising determining that the subset of the plurality of memory ranks that have not received the refresh subsequent to the memory ranks exiting the first self-timed refresh mode based on the refresh observed flags.

19. The method of claim 16, wherein the retrain request is received via a high speed link connecting the memory controller to a redrive device.

20. The method of claim 16, wherein the plurality of memory ranks include a double data rate type three synchronous dynamic random access memory (DDR3 SDRAM).

* * * * *